US009682599B1

(12) United States Patent
Hinque et al.

(10) Patent No.: US 9,682,599 B1
(45) Date of Patent: Jun. 20, 2017

(54) ON-WHEEL AIR MAINTENANCE SYSTEM

(71) Applicant: The Goodyear Tire & Rubber Company, Akron, OH (US)

(72) Inventors: Daniel Paul Luc Marie Hinque, Habay-la-Neuve (BE); Gilles Bonnet, Niederfenlen (LU); Olivier Di Prizio, Hettange-Grande (FR); Gauthier Piret, Ster-Francorchamps (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 55 days.

(21) Appl. No.: 14/963,746

(22) Filed: Dec. 9, 2015

(51) Int. Cl.
*B60C 23/12* (2006.01)
*B60C 23/00* (2006.01)
*B60S 5/04* (2006.01)

(52) U.S. Cl.
CPC ............. *B60C 23/004* (2013.01); *B60S 5/043* (2013.01)

(58) Field of Classification Search
CPC ................................ B60C 23/10; B60C 23/12
See application file for complete search history.

(56) References Cited

U.S. PATENT DOCUMENTS

| 2,211,935 | A | 8/1940 | Parker |
| 2,415,618 | A | 2/1947 | West |
| 3,012,820 | A | 12/1961 | King |
| 3,047,339 | A | 7/1962 | Hamer |
| 3,152,553 | A | 10/1964 | Sverker |
| 3,532,449 | A | 10/1970 | Garton |
| 3,981,633 | A | 9/1976 | Wall |

(Continued)

FOREIGN PATENT DOCUMENTS

EP 3031634 A1 6/2016

OTHER PUBLICATIONS

European Search Report dated Feb. 13, 2017 for Application Serial No. EP16201035.

*Primary Examiner* — Jason Bellinger
(74) *Attorney, Agent, or Firm* — Robert N. Lipcsik

(57) ABSTRACT

An air maintenance system includes a rotating inner ring associated with a vehicle wheel, a stationary outer ring maintaining a constant angular position, the stationary outer ring including ring segments secured together by a plurality of connecting shafts, an occlusion roller rotationally fixed to the stationary outer ring by a first connecting shaft of the plurality of connecting shafts, the occlusion roller having a protruding portion centered axially at a radially outer surface of the occlusion roller with axially outer portions of the occlusion roller being radially recessed from the protruding portion and supported by bearing surfaces of the rotating inner ring, spacer rollers rotationally fixed to the stationary outer ring by second and third connecting shafts of the plurality of connecting shafts and rotationally supported by the bearing surfaces, and a flexible tube defining a pump cavity, the air maintenance system pumping a fluid from the ambient environment into a pneumatic tire by applying an occluding force against the flexible tube, periodically occluding portions of the pump cavity. The spacer rollers have axially outer surfaces for rotational support by bearing surfaces of the rotating inner ring and a recess centered axially at the outer surface of the spacer rollers for avoiding any contact between the spacer rollers and the flexible tube.

15 Claims, 5 Drawing Sheets

(56) References Cited

U.S. PATENT DOCUMENTS

| | | |
|---|---|---|
| 4,030,300 A | 6/1977 | Thompson |
| 4,095,923 A | 6/1978 | Cullis |
| 4,121,472 A | 10/1978 | Vural et al. |
| 4,157,530 A | 6/1979 | Merz |
| 4,256,971 A | 3/1981 | Griffith |
| 4,291,235 A | 9/1981 | Bergey, Jr. et al. |
| 4,370,894 A | 2/1983 | Sturesson |
| 4,536,668 A | 8/1985 | Boyer |
| 4,606,710 A | 8/1986 | Maguire |
| 4,637,152 A | 1/1987 | Roy |
| 4,807,487 A | 2/1989 | Seidl |
| 4,819,593 A | 4/1989 | Bruener et al. |
| 4,922,984 A | 5/1990 | Dosjoub et al. |
| 5,018,797 A | 5/1991 | Takata |
| 7,117,731 B2 | 10/2006 | Hrabal |
| 8,042,586 B2 | 10/2011 | Losey et al. |
| 8,113,254 B2 | 2/2012 | Benedict |
| 8,235,081 B2 | 8/2012 | Delgado |
| 8,763,661 B2 | 7/2014 | Richardson |
| 2016/0167465 A1* | 6/2016 | Hinque ................. B60C 23/12 152/419 |

\* cited by examiner

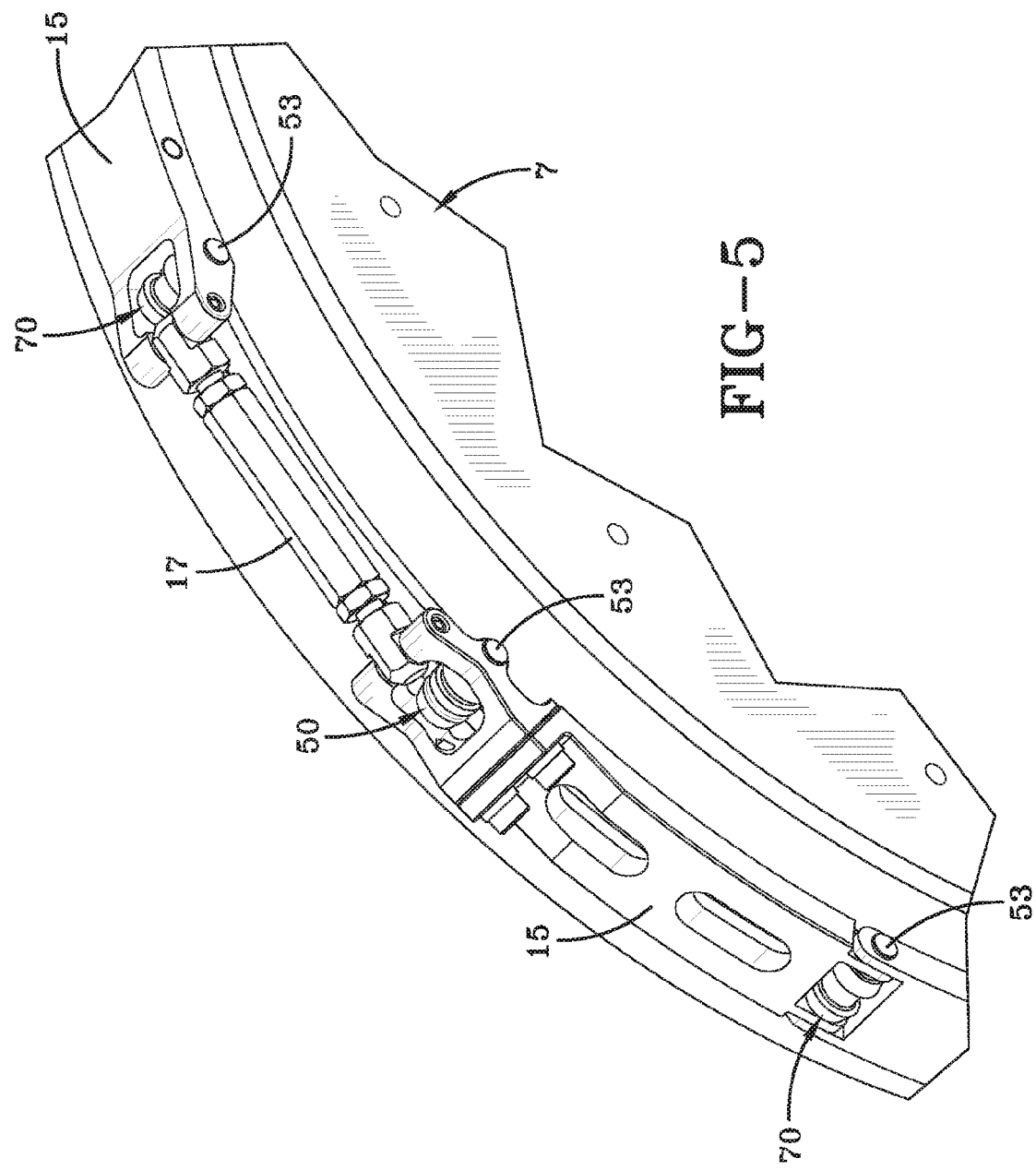

ON-WHEEL AIR MAINTENANCE SYSTEM

TECHNICAL FIELD

The present invention relates generally to the automotive field, and more specifically, to a new and useful tire air maintenance system in the automotive field.

BACKGROUND OF THE PRESENT INVENTION

Non-optimally pressurized pneumatic tires contribute to low fuel efficiency. These effects are particularly felt in the trucking industry, where long distances and large loads amplify the effects of an underinflated tire. However, it is often inconvenient and inefficient for truck drivers to constantly stop, check, and inflate the vehicle tires to the optimal pressure, leading to the persistence of less-than-optimal fuel efficiency in truck fleets. This challenge has led to several conventional auto-inflating tire systems. Conventional auto-inflating tire systems may be either central or distributed, but each suffers from its own set of drawbacks. Central inflation systems are complex and expensive, and require significant work for aftermarket installation (drilling through axles, tapping existing air lines, etc.). Distributed systems are mounted at each wheel and can be less expensive, but the potential for reduced cost is typically at the expense of the continuous replacement of the device (which fails due to the harsh wheel environment). Thus, there is a need in the automotive field to create a new and useful air maintenance system for pneumatic tires.

SUMMARY OF THE INVENTION

An air maintenance system in accordance with the present invention includes a rotating inner ring associated with, or secured to, a vehicle wheel, a stationary outer ring maintaining a constant angular position, the stationary outer ring including ring segments secured together by a plurality of connecting shafts, an occlusion roller rotationally fixed to the stationary outer ring by a first connecting shaft of the plurality of connecting shafts, the occlusion roller having a protruding portion centered axially at a radially outer surface of the occlusion roller with axially outer portions of the occlusion roller being radially recessed from the protruding portion and supported by bearing surfaces of the rotating inner ring, spacer rollers rotationally fixed to the stationary outer ring by second and third connecting shafts of the plurality of connecting shafts and rotationally supported by the bearing surfaces, and a flexible tube defining a pump cavity, the air maintenance system pumping a fluid from the ambient environment into a pneumatic tire by applying an occluding force against the flexible tube, periodically occluding portions of the pump cavity. The spacer rollers have axially outer surfaces for rotational support by bearing surfaces of the rotating inner ring and a recess centered axially at the outer surface of the spacer rollers for avoiding any contact between the spacer rollers and the flexible tube.

According to another aspect of the system, the flexible tube is molded directly into the vehicle wheel.

According to still another aspect of the system, the flexible tube is machined on to the vehicle wheel.

According to yet another aspect of the system, the rotating inner ring rotates concentrically relative to the stationary outer ring.

According to still another aspect of the system, the bearing surfaces of the inner rotating ring provide a smooth conical surface for the spacer rollers and the occlusion roller.

According to yet another aspect of the system, the stationary outer ring encircles the air maintenance system and applies an inward radial force against the spacer rollers when assembled.

According to still another aspect of the system, the inward radial force maintains the inner rotating ring and the spacer rollers in a concentric relationship.

According to yet another aspect of the system, the inner rotating ring has a substantially homogeneous weight distribution such that no portion of the inner rotating ring is substantially heavier than another portion.

According to still another aspect of the system, the inner rotating ring is substantially rigid and made of metal.

According to yet another aspect of the system, the inner rotating ring is made of a rigid polymer.

According to still another aspect of the system, the mass of the stationary outer ring overcomes inertia and friction generated by rotation of the inner rotating ring and rotating wheel such that the stationary outer ring stays substantially static while the inner rotating ring and vehicle wheel rotate.

According to yet another aspect of the system, the stationary outer ring maintains the angular position relative to a road surface as the vehicle wheel rotates and provides torque, generated by gravity, that opposes the rotation of the stationary outer rotating ring with the vehicle wheel.

According to still another aspect of the system, the mass of the stationary outer ring prevents the stationary outer ring from rotating with the vehicle wheel and the inner rotating ring.

According to yet another aspect of the system, the spacer rollers retain non-slip contact between the spacer rollers and the bearing surfaces of the inner rotating ring.

According to still another aspect of the system, the system includes three spacer rollers.

According to yet another aspect of the system, the flexible tube defines a deformable surface that occludes the pump cavity.

According to still another aspect of the system, the flexible tube has an oval cross section.

According to yet another aspect of the system, the flexible tube comprises a flexible, elastomeric material.

DEFINITIONS

"Apex" refers to a wedge of rubber placed between the carcass and the carcass turnup in the bead area of the tire, usually used to stiffen the lower sidewall of the tire.

"Axial" and "axially" means lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt reinforcing structure" means at least two layers of plies of parallel cords, woven or unwoven, underlying the tread, unanchored to the bead, and having both left and right cord angles in the range from 17 degrees to 27 degrees with respect to the equatorial plane of the tire.

"Bias ply tire" means a tire having a carcass with reinforcing cords in the carcass ply extending diagonally across the tire from bead core to bead core at about a 25 to 50 degree angle with respect to the equatorial plane of the tire. Cords run at opposite angles in alternate layers.

"Breakers" refers to at least two annular layers or plies of parallel reinforcement cords having the same angle with reference to the equatorial plane of the tire as the parallel reinforcing cords in carcass plies.

"Carcass ply" means the tire structure apart from the belt structure, tread, undertread, sidewall rubber and the beads.

"Chafers" refers to narrow strips of material placed around the outside of the bead to protect cord plies from the rim, distribute flexing above the rim, and to seal the tire.

"Cord" means one of the reinforcement strands of which the plies in the tire are comprised.

"Design rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organization-Standards Manual and the term design rim means the same as the standard measurement rims. In Japan, the standard organization is The Japan Automobile Tire Manufacturer's Association.

"Design rim width" is the specific commercially available rim width assigned to each tire size and typically is between 75 and 90% of the specific tire's section width.

"Equatorial plane (EP)" means the plane perpendicular to the tire's axis of rotation and passing through the center of its tread.

"Filament" refers to a single yarn.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Lateral edge" means the axially outermost edge of the tread as defined by a plane parallel to the equatorial plane and intersecting the outer ends of the axially outermost traction lugs at the radial height of the inner tread surface.

"Leading" refers to a portion or part of the tread that contacts the ground first, with respect to a series of such parts or portions, during rotation of the tire in the direction of travel.

"Molded base width" refers to the distance between the beads of the tire in the curing mold. The cured tire, after removal from the curing mold will substantially retain its molded shape, and "molded base width" may also refer to the distance between the beads in an unmounted, cured tire.

"Net contact area" means the total area of ground contacting tread elements between the lateral edges.

"Nominal rim diameter" means the average diameter of the rim flange at the location where the bead portion of the tire seats.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Pantographing" refers to the shifting of the angles of cord reinforcement in a tire when the diameter of the tire changes, e.g. during the expansion of the tire in the mold.

"Ply" means a continuous layer of rubber-coated parallel cords.

"Pneumatic tire" means a mechanical device of generally toroidal shape (usually an open torus) having beads and a tread and made of rubber, chemicals, fabric and steel or other materials. When mounted on the wheel of a motor vehicle, the tire, through its tread, provides a traction and contains the fluid or gaseous matter, usually air that sustains the vehicle load.

"Radial" and "radially" means directions radially toward or away from the axis of rotation of the tire.

"Radial-ply tire" means a belted or circumferentially restricted pneumatic tire in which the ply cords which extend from bead to bead are laid at cord angles between 65 to 90 degrees with respect to the equatorial plane of the tire.

"$Rho_m$" refers to the perpendicular distance from the axis of rotation of a tire to a line parallel to the axis of rotation which passes through the maximum section width of the tire.

"Section height" (SH) means the radial distance from the nominal rim diameter to the outer diameter of the tire at its equatorial plane.

"Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of a sidewall just below the tread edge.

"Sidewall" means that portion of a tire between the tread and the bead.

"Splice" refers to the connection of end of two components, or the two ends of the same component in a tire. "Splice" may refer to the abutment or the overlapping of two such ends.

"Strain energy density" refers to the summation of the product of the six stress components (three normal stresses and three shear stresses) and their corresponding strains.

"Tire design load" is the base or reference load assigned to a tire at a specific inflation pressure and service condition: other load-pressure relationships applicable to the tire are based upon that base or reference.

"Tread" means a molded rubber component which, when bonded to a tire casing, includes that portion of the tire which comes into contact with the road when the tire is normally inflated and under normal load.

"Tread arc width" (TAW) means the width of an arc having its center located on the plane (EP) and which substantially coincides with the radially outermost surfaces of the various traction elements (lugs, blocks, buttons, ribs, etc.) across the lateral or axial width of the tread portions of a tire when the tire is mounted upon its designated rim and inflated to its specified inflation pressure but not subjected to any load.

"Tread width" means the arc length of the tread surface in the axial direction, that is, in a plane passing through the axis of rotation of the tire.

"Unit tread pressure" means the radial load borne per unit area (square centimeter or square inch) of the tread surface when that area is in the footprint of the normally inflated and normally loaded tire.

"Wedge" refers to a tapered rubber insert, usually used to define individual curvature of a reinforcing component, e.g. at a belt edge.

BRIEF DESCRIPTION OF DRAWINGS

The present invention will be described by way of example and with reference to the accompanying drawings, in which:

FIG. 5 schematically illustrates another part of an air maintenance assembly in accordance with the present invention.

DETAILED DESCRIPTION OF EXAMPLES OF HE PRESENT INVENTION

Figure 1:
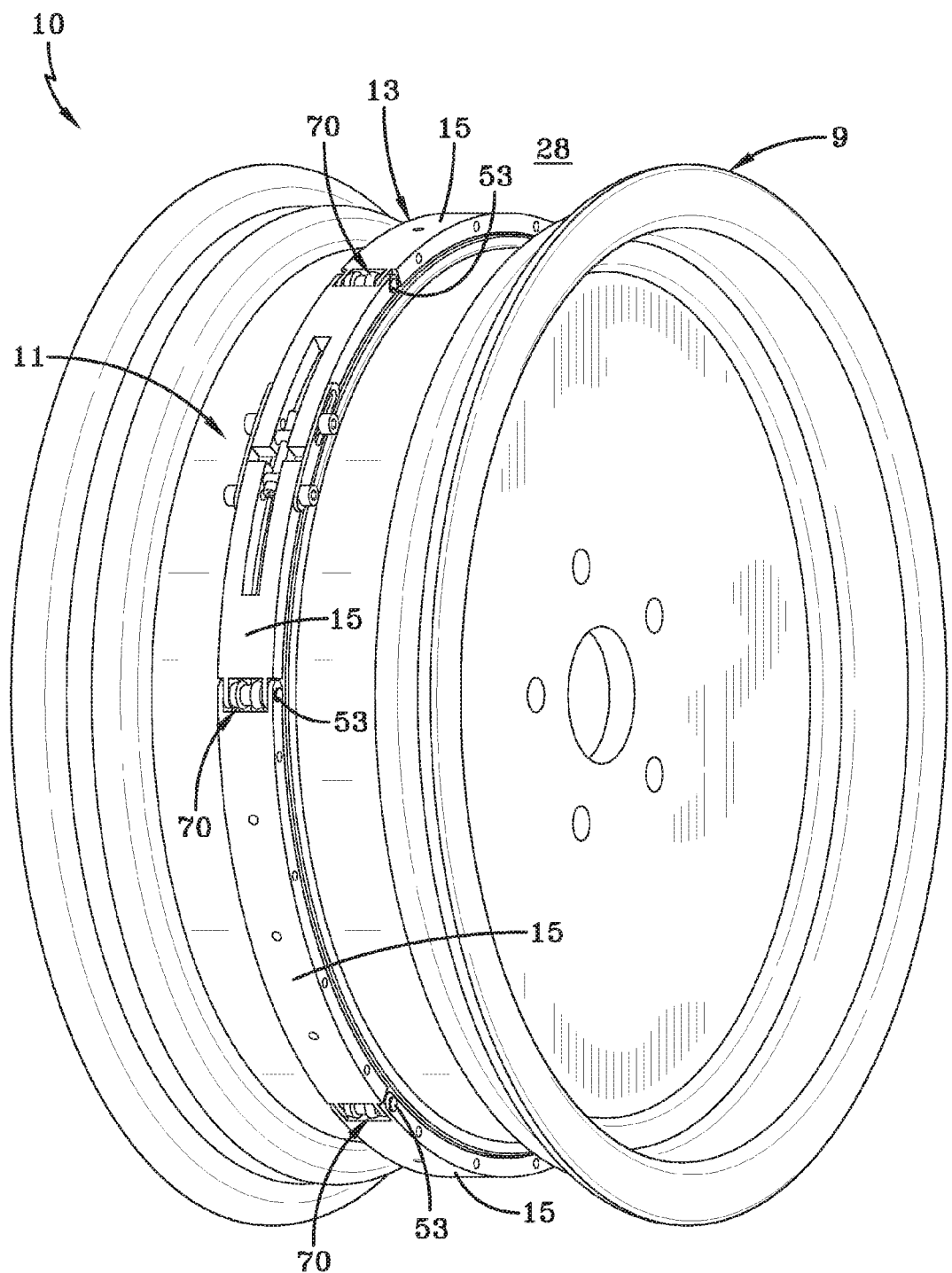
FIG. 1 schematically illustrates a perspective view of part of an air maintenance assembly in accordance with the present invention.

A conventional tire inflation system may mount to the wheel of a vehicle. The tire inflation system may include a pumping ring that rotates with the wheel and a positioning system rotatably coupled to the wheel. The positioning system may include a positioning mechanism and an eccentric mass. A planetary roller may be disposed in non-slip contact with the pumping ring and the positioning system. A flexible diaphragm may define a pump cavity wherein relative motion between the pumping ring and positioning system may be translated by the planetary roller into an occluding force that deforms the diaphragm and thereby occludes the pump cavity. Relative motion between the pumping ring and the positioning system may be achieved by coupling the eccentric mass to the positioning mechanism to offset the center of mass of the positioning system from the center of rotation of the positioning system. Such a system has been disclosed by U.S. Pat. No. 8,763,661, incorporated herein by reference in its entirety.

Another example air maintenance system may include a rotating inner ring, a stationary outer ring, an eccentric mass, an occlusion roller located proximate to the eccentric mass, and a flexible tube that defines a pump cavity. The air maintenance system may be coupled to a rotating wheel wherein the rotating inner ring rotates with the rotating wheel while the eccentric mass maintains a constant angular position relative to the rotating wheel. This arrangement may thereby generate relative motion between the rotating inner ring and the eccentric mass. The air maintenance system may translate this relative motion into mechanical work or other energy forms. The air maintenance system may pump a fluid from the ambient environment into a pneumatic tire seat to the rotating wheel by applying an occluding force against the flexible tube, periodically occluding portions of the pump cavity. The air maintenance system may be coupled to the rim of the wheel, such as that of a truck, compact vehicle, motorcycle, bicycle and/or other vehicle. Relative diameters between the inner rotating ring and roller elements may collaborate to achieve a desired gear ratio and pumping speed. The pumping rate, pressure, and frequency may also be controlled with a passive or an active control mechanism.

The inner rotating ring may apply an occluding force against the flexible tube. The inner rotating ring also may provide a smooth bearing surface for the roller elements and an occlusion roller, and may additionally contain or constrain other components of the air maintenance system. The inner rotating ring may rotate with the rotating wheel, and may be statically, but removably, coupled to the rotating wheel. An outer ring may encircle the air maintenance system and apply an inward radial force against the rollers when assembled. This inward radial force may maintain the inner rotating ring and the rollers. The inner rotating ring may have a substantially homogeneous weight distribution such that no portion of the inner rotating ring is substantially heavier than another portion. The inner rotating ring may be substantially rigid and made of metal (e.g. stainless steel, aluminum, titanium), but may alternately be made of a rigid polymer (e.g. polyacetylenes, polyfluroenes, nylon, and polyimides) or a ceramic.

The eccentric mass may overcome the inertia and friction generated by the rotation of the inner rotating ring and rotating wheel such that the eccentric mass stays substantially static while the inner rotating ring rotates. Further, the eccentric mass may be coupled to the air maintenance system to maintain the angular position of the eccentric mass relative to the road surface (which is contacted by the wheel) as the wheel rotates and provides torque, generated by gravity, that opposes the rotation of the inner rotating ring with the wheel. In other words, the eccentric mass may prevent the outer ring from rotating with the wheel and the inner rotating ring. This relative motion, enabled by the gravitational pull on the eccentric mass, may be harvested to do mechanical work.

This relative motion may occur because the center of mass of the eccentric mass is not located at the center of rotation such that the pull of gravity on the eccentric mass may allow it to remain substantially static relative to the road surface while the inner rotating ring rotates relative to the road surface. The weight of the eccentric mass may be large enough to generate the amount of mechanical work desired, in addition to being large enough to overcome friction and adequately dampen induced oscillations resulting from non-rotating motion (e.g. from bumps). The eccentric mass may be rectangular, spherical, or amorphous. The eccentric mass may be made of metal, such as stainless steel, copper, aluminum, etc., but may alternately be made of plastic, ceramic, and/or a fluid/gel. The roller elements may additionally retain non-slip contact between the roller elements and the inner rotating ring, but may not provide a direct occluding force. The air maintenance system may include two, three, five, or any suitable number of rollers.

The flexible tube may define the pump cavity that holds a fluid and a deformable interface that occludes the pump cavity. The flexible tube may have a circular or oval cross section. The flexible tube may comprise a flexible, elastomeric material such as rubber or thermosets, thermoplastics, or any other suitable material. The flexible tube may include an inlet port and an outlet port each in fluid connection with tubes and a pressure regulator assembly.

The pressure regulator assembly may include a control valve, check valves, a filter, and an inlet port for receiving ambient air. A housing of the pressure regulator assembly may be secured to the wheel with the inlet port located externally to the tire cavity of the tire and the remaining structures of the pressure regulator assembly located internally to the tire cavity.

The air maintenance system may utilize a peristaltic or reciprocating pump method. In the peristaltic method, the occlusion roller may constrict a portion the flexible tube that is adjacent the occlusion roller thereby deforming the flexible tube segment by segment between an expanded condition and an at least partially collapsed condition in response to respective segment by segment deformation by the occlusion roller located, with the eccentric mass, by gravity statically at the bottom of the outer ring.

The rotating inner ring may be disposed concentrically within the stationary outer ring with the roller elements determining its orientation relative to the stationary outer ring. The roller elements may be rotatably secured to the stationary outer ring by a shaft. The stationary outer ring may comprise a plurality of segments (e.g., 3, 4, 5, etc.) having a female mating connection at one end and a male connection at its opposite end. The rotating inner ring may comprise a roller element track for receiving the roller elements, a plurality of segments (e.g., 1, 2, 3, 4, etc.) with a female recess at one end for mating with a male clip connection at its opposite end. Each end may further have slots for securing the flexible tube. The rotating inner ring may be secured to wheel by connecting the ends. The occlusion roller may be rotatably attached to the stationary outer ring by a shaft such that the occlusion roller, held stationary by the eccentric mass, rolls and squeezes the flexible tube as the rotating inner ring and wheel rotate. The roller elements may travel along the roller element track and the occlusion roller may sequentially squeeze the flexible tube as the wheel rotates. The housing of the pressure regulator assembly may include a fill port for regular tire pressure maintenance (e.g., an initial air fill up, etc.). Such an example system has been disclosed by US Publication No. 2016/0167465, published on Jun. 16, 2016, incorporated herein by reference in its entirety.

Figure 2:
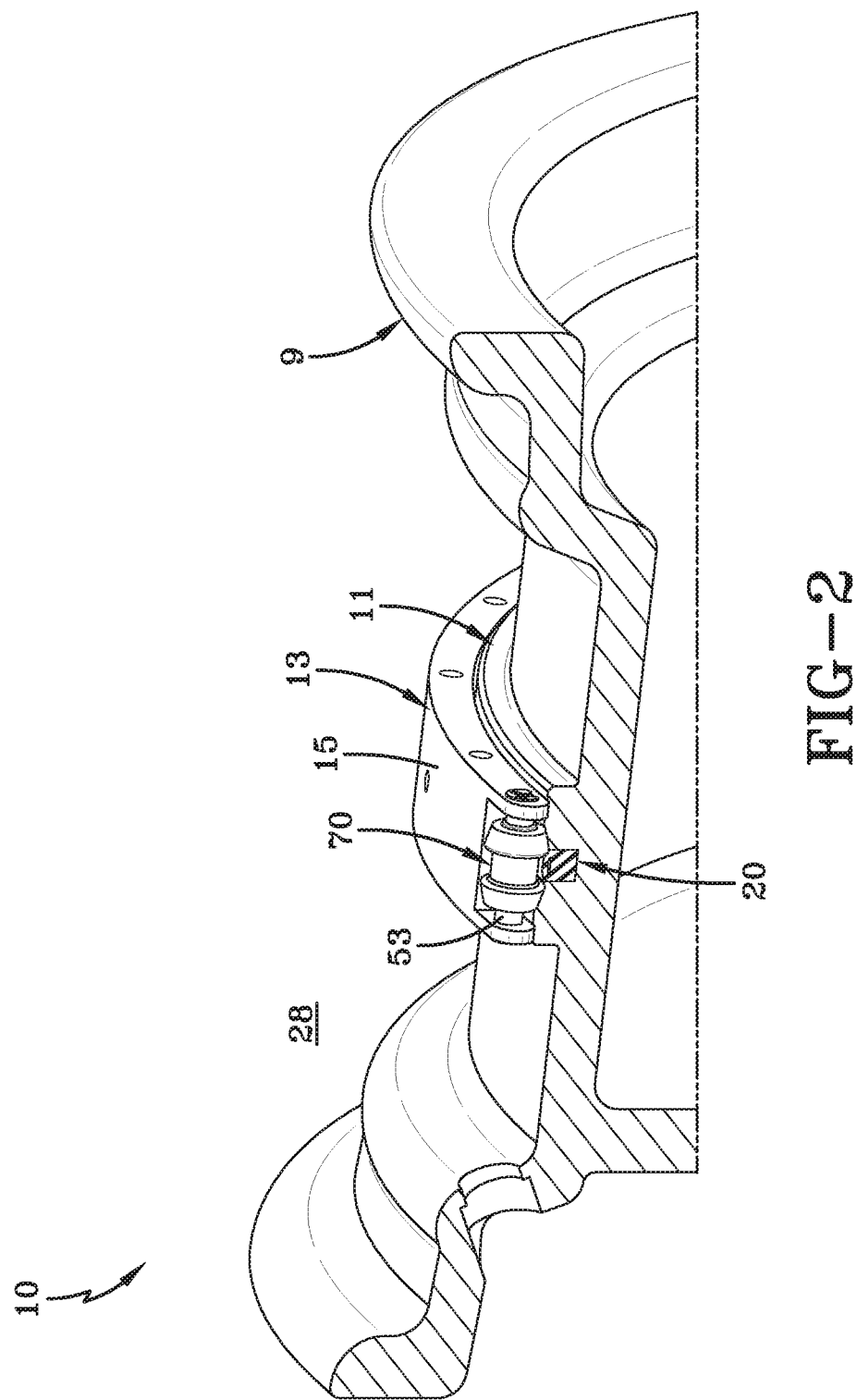
FIG. 2 schematically illustrates a cross-sectional view of another part of an air maintenance assembly in accordance with the present invention.
Figure 3:
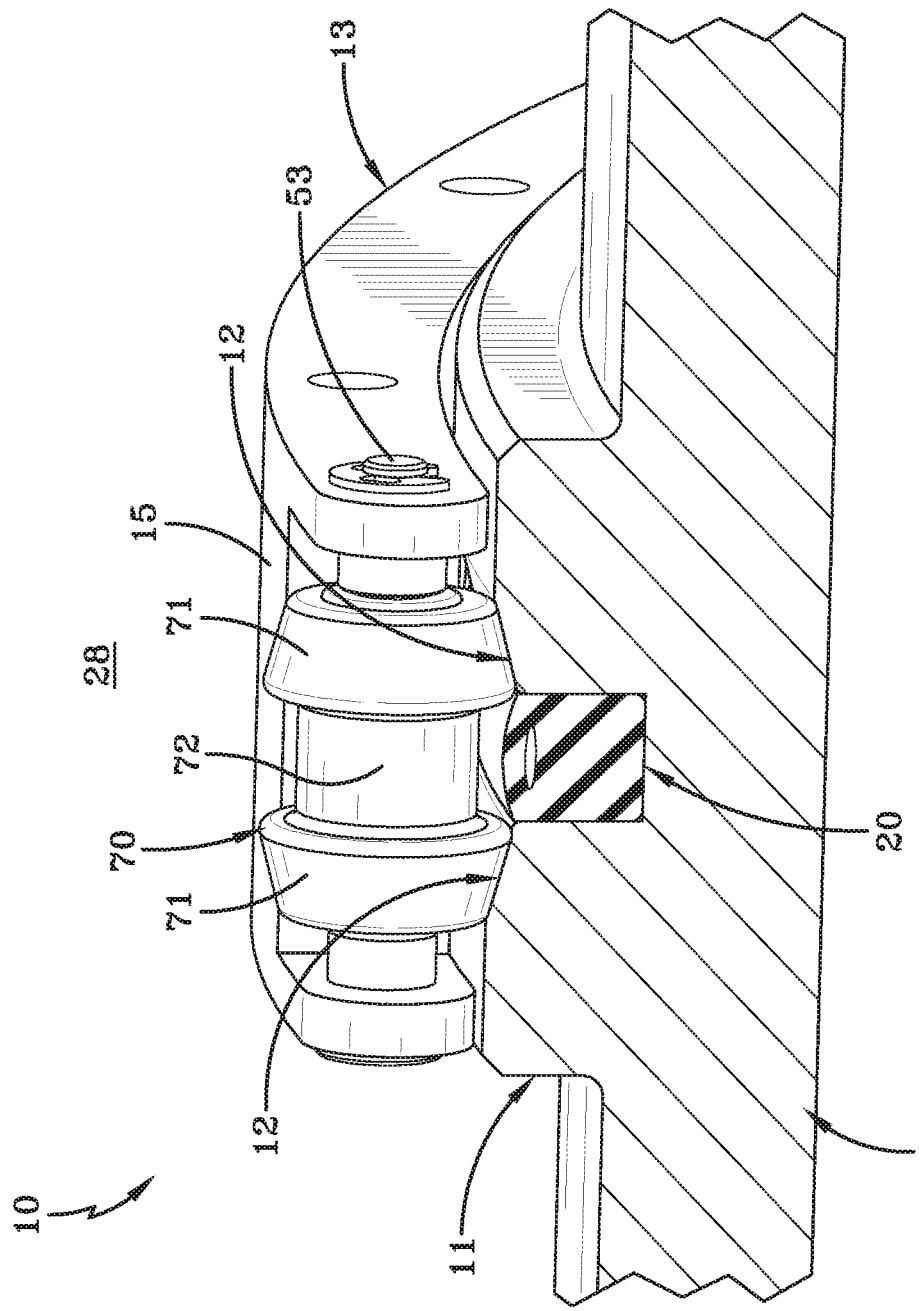
FIG. 3 schematically illustrates a detailed cross-sectional view of the part FIG. 2.
Figure 4:
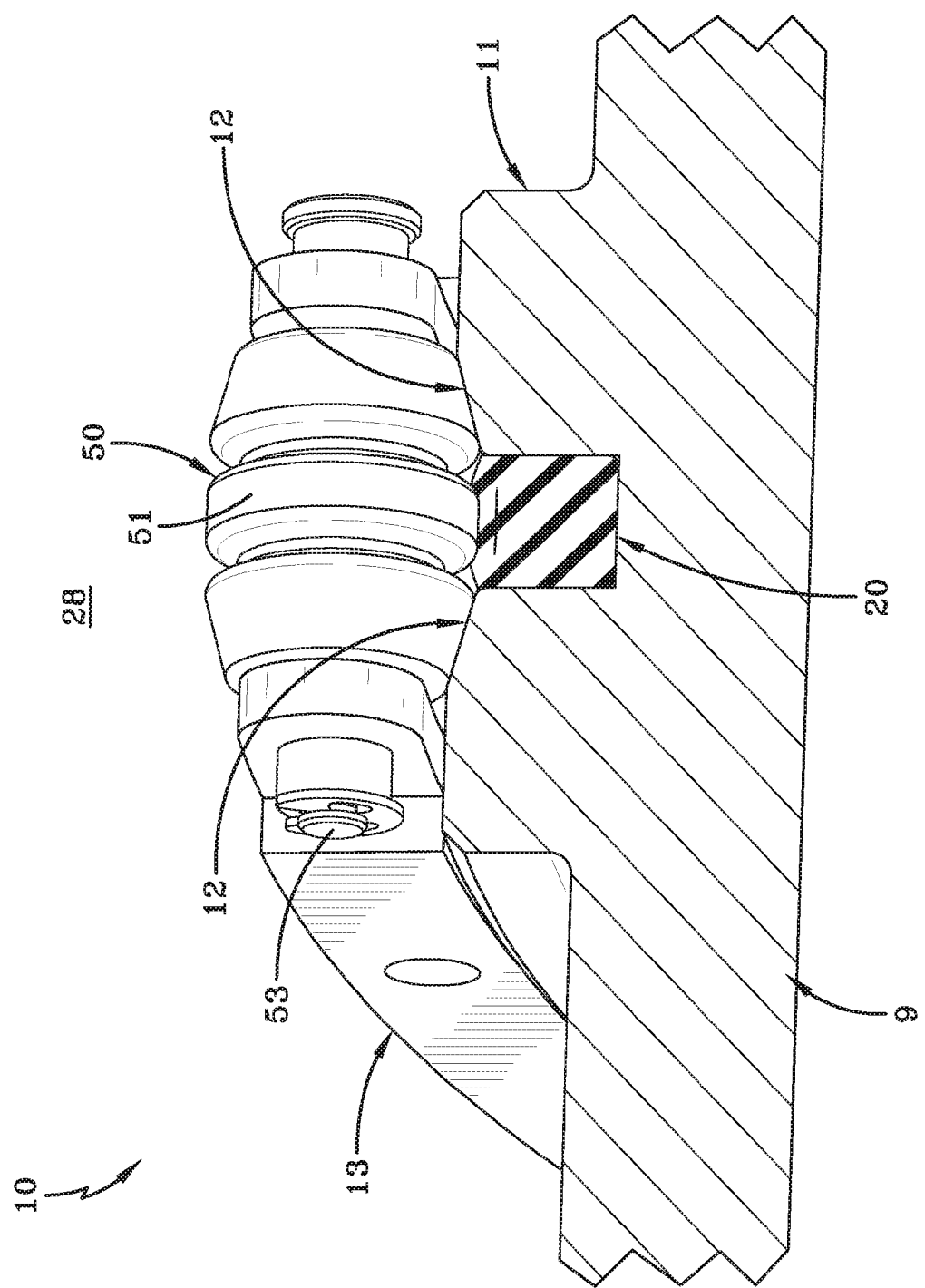
FIG. 4 schematically illustrates a detailed cross-sectional view of the part FIG. 3 under a different condition.

As shown in FIGS. 1-5, an air maintenance system 10 in accordance with the present invention may include a segmented ring 13 equipped with rollers 50, 70 installed on shafts 53 at the intersection of ring segments 15. Slack compensation may be implemented by an extendable segment 17 which allows tuning of the circumferential length of the segmented ring 13 and also allows extension of the segmented ring for mounting operations. The ring segments 15 may be connected by axles/shafts 53 on which may be installed rollers 50, 70 and lubricated or non-lubricated bearings surfaces 12. Configurations of roller bearings or needles bearings may alternatively be used. The bearings 12 thus allow the segmented ring 13 to rotate concentrically with an inner ring 11 attached to a vehicle rim 9. The system 10 may be secured to a modified rim 9 which allows mounting of a tire without removing the system from the rim.

The system 10 may have a diameter smaller than the bead seat diameter in order to allow tire mounting operations without contacting the system. A flexible tube 20 may be added as an additional part secured to the modified rim 9. Alternatively, the inner ring 11 and/or the flexible tube 20 may be molded and/or machined directly on/into the modified rim 9 to reduce complexity (e.g., number of parts, etc.) and to improve integration (e.g., co-axiality, balance, weight, etc.) with the modified rim.

Parts of the system 10 may be tested on a lab drum 7 (FIG. 5). The driving device may be tested and the influence of the tube pinching device parameters on the dynamic behavior of the system 10 may be evaluated. These tests can be performed without tube connections or valves, since no pneumatic pumping is tested.

As shown in FIGS. 1-4, a system 10 in accordance with the present invention may include an occlusion roller 50. The occlusion roller 50 may include a protruding portion 51 for constricting a portion the flexible tube 20 that is adjacent the occlusion roller and deforming the flexible tube, segment by segment, between an expanded condition and an at least partially collapsed condition in response to respective segment by segment deformation by the occlusion roller sustained, with an eccentric mass (not shown), by gravity statically at the bottom of an outer segmented ring 13. The flexible tube 20 may be fixed to an inner ring 11. The inner ring 11 may be fixed to a vehicle rim 9. The protruding portion 51 may be centered axially at a radially outer surface of the occlusion roller 50 with axially outer portions of the occlusion roller being radially recessed from the protruding portion and supported by bearing surfaces 12 on the inner ring 11.

The system 10 may further include at least two spacer rollers 70 for maintaining a concentric relationship between the inner ring 11 and an outer ring 13 to which the occlusion roller 50 is rotationally secured. The spacer rollers 70 may have axially outer surfaces 71 for rotational support by the bearing surfaces 12 of the inner ring 11. A recess 72 of the spacer rollers 70 may be centered axially at the outer surface of the spacer rollers for avoiding any contact between the spacer rollers and the flexible tube 20. A pressure regulator assembly (not shown) may harvest the pressure generated with the system 10 for maintaining appropriate air pressure within a tire cavity 28.

As a person skilled in the art will recognize from the above detailed description and from the figures and claims, modifications and changes may be made to the examples of the present invention without departing from the scope of the present invention defined by the following claims.

The invention claimed is:

1. An air maintenance system comprising:
 a rotating inner ring associated with a vehicle wheel;
 a stationary outer ring maintaining a constant angular position, the stationary outer ring including ring segments secured together by a plurality of connecting shafts;
 an occlusion roller rotationally fixed to the stationary outer ring by a first connecting shaft of the plurality of connecting shafts, the occlusion roller having a protruding portion centered axially at a radially outer surface of the occlusion roller with axially outer portions of the occlusion roller being radially recessed from the protruding portion and supported by bearing surfaces of the rotating inner ring;
 spacer rollers rotationally fixed to the stationary outer ring by second and third connecting shafts of the plurality of connecting shafts and rotationally supported by the bearing surfaces; and
 a flexible tube defining a pump cavity, the air maintenance system pumping a fluid from the ambient environment into a pneumatic tire by applying an occluding force against the flexible tube, periodically occluding portions of the pump cavity,
 the spacer rollers having axially outer surfaces for rotational support by bearing surfaces of the rotating inner ring and a recess centered axially at the outer surface of the spacer rollers for avoiding any contact between the spacer rollers and the flexible tube.

2. The air maintenance system as set forth in claim 1 wherein the flexible tube is molded directly into the vehicle wheel.

3. The air maintenance system as set forth in claim 1 wherein the rotating inner ring rotates concentrically relative to the stationary outer ring.

4. The air maintenance system as set forth in claim 1 wherein the stationary outer ring encircles the air maintenance system and applies an inward radial force against the spacer rollers when assembled.

5. The air maintenance system as set forth in claim 4 wherein the inward radial force maintains the inner rotating ring and the spacer rollers in a concentric relationship.

6. The air maintenance system as set forth in claim 1 wherein the inner rotating ring has a substantially homogeneous weight distribution such that no portion of the inner rotating ring is substantially heavier than another portion.

7. The air maintenance system as set forth in claim 1 wherein the inner rotating ring is substantially rigid and made of metal.

8. The air maintenance system as set forth in claim 1 wherein the inner rotating ring is made of a rigid polymer.

9. The air maintenance system as set forth in claim 1 wherein the mass of the stationary outer ring overcomes inertia and friction generated by rotation of the inner rotating ring and rotating wheel such that the stationary outer ring stays substantially static while the inner rotating ring and vehicle wheel rotate.

10. The air maintenance system as set forth in claim 1 wherein the stationary outer ring maintains the angular position relative to a road surface as the vehicle wheel rotates and provides torque, generated by gravity, that opposes the rotation of the stationary outer rotating ring with the vehicle wheel.

11. The air maintenance system as set forth in claim 1 wherein the mass of the stationary outer ring prevents the stationary outer ring from rotating with the vehicle wheel and the inner rotating ring.

12. The air maintenance system as set forth in claim 1 wherein the spacer rollers retain non-slip contact between the spacer rollers and the bearing surfaces of the inner rotating ring.

13. The air maintenance system as set forth in claim 1 wherein the system includes three spacer rollers.

14. The air maintenance system as set forth in claim 1 wherein the flexible tube defines a deformable surface that occludes the pump cavity.

15. The air maintenance system as set forth in claim 1 wherein the flexible tube comprises a flexible, elastomeric material.

\* \* \* \* \*